(12) United States Patent
Sanna

(10) Patent No.: US 6,786,058 B2
(45) Date of Patent: Sep. 7, 2004

(54) CONTROL DEVICE OF SIMPLE CONSTRUCTION FOR A HOUSEHOLD ELECTRICAL APPLIANCE

(75) Inventor: Salvatore Sanna, Biandronno (IT)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 10/341,147

(22) Filed: Jan. 13, 2003

(65) Prior Publication Data

US 2003/0131620 A1 Jul. 17, 2003

(30) Foreign Application Priority Data

Jan. 14, 2002 (IT) .................................... MI2002A0053

(51) Int. Cl.[7] ............................ F25B 1/00; H04B 1/06
(52) U.S. Cl. ........................ 62/229; 236/51; 236/780; 455/344
(58) Field of Search .................. 236/51, 780; 455/344; 62/229

(56) References Cited

U.S. PATENT DOCUMENTS 5,097,671 A * 3/1992 Jeong-Hun .................. 62/126
5,421,247 A * 6/1995 Shim .......................... 99/468
6,556,813 B2 * 4/2003 Tsui ............................ 455/92

* cited by examiner

Primary Examiner—William Wayner
(74) Attorney, Agent, or Firm—Robert O. Rice; John F. Colligan; Stephen Krefman

(57) ABSTRACT

The present invention relates to a control device for a household electrical appliance. The control device has an interface configured to enable a user to set or modify parameters of one or more operational members of the appliance by a command and control circuit in communication with the appliance. The interface has a one or more selectors arranged to enable setting or modifying of the parameters of the appliance. The selectors are connected to a resonant electrical circuit arranged to generate or to respond to a radio-frequency signal in a modifiable manner representative of the setting or modification effected by the user. The signal also being sensed by a sensor associated with the command and control circuit, which enables the command and control circuit to set or modify in an appropriate manner the parameters of the operational members for controlled operation of the household electrical appliance.

11 Claims, 4 Drawing Sheets

CONTROL DEVICE OF SIMPLE CONSTRUCTION FOR A HOUSEHOLD ELECTRICAL APPLIANCE

BACKGROUND OF THE INVENTION

1. Field of the Invention

The present invention relates to a control device for a household electrical appliance.

2. Description of the Related Art

Various types of devices are known for controlling the operation of a household electrical appliance such as a refrigerator, an electric or microwave oven, a washing machine or the like. These devices are positioned on a "user interface" generally associated with a part of the appliance structure or cabinet.

It is also known to position a user interface on the door covering the cavity or chamber (preservation, wash or cooking) of the appliance in which the "load" (food, crockery, laundry, etc.) is placed for subjection to an intervention (preservation, wash, cooking etc.); in this case the user interface and the means for setting the control means for the various operational members of the appliance (electric motor, compressor, heater elements or microwave generators) are connected to the control means generally by electrical connection members which have however to enable the door to move relative to the (fixed) structure of the appliance. This is a problem which requires considerable effort for its solution, with corresponding design and construction costs which affect the final cost of the appliance.

Another technical problem is the poor flexibility of the appliance user interface, in that once the position of the various buttons or knobs of the interface has been determined, it is not simple to change their positioning without having to redesign the printed circuits (PCBs) which lie below the user interface.

SUMMARY OF THE INVENTION

An object of the present invention is to provide a device for controlling the operation of a household electrical appliance, of the type comprising an interface positioned on the electrical appliance, which is of simple construction, is of low cost and enables the aforestated technical problems to be overcome.

Another object is to provide a device of the aforestated type which is simple and reliable to use.

These and further objects which will be apparent to the expert of the art are attained by a device in accordance with the accompanying claims.

BRIEF DESCRIPTION OF THE DRAWINGS

The present invention will be more apparent from the accompanying drawing, which is provided by way of non-limiting example and in which.

DETAILED DESCRIPTION

Figure 1:
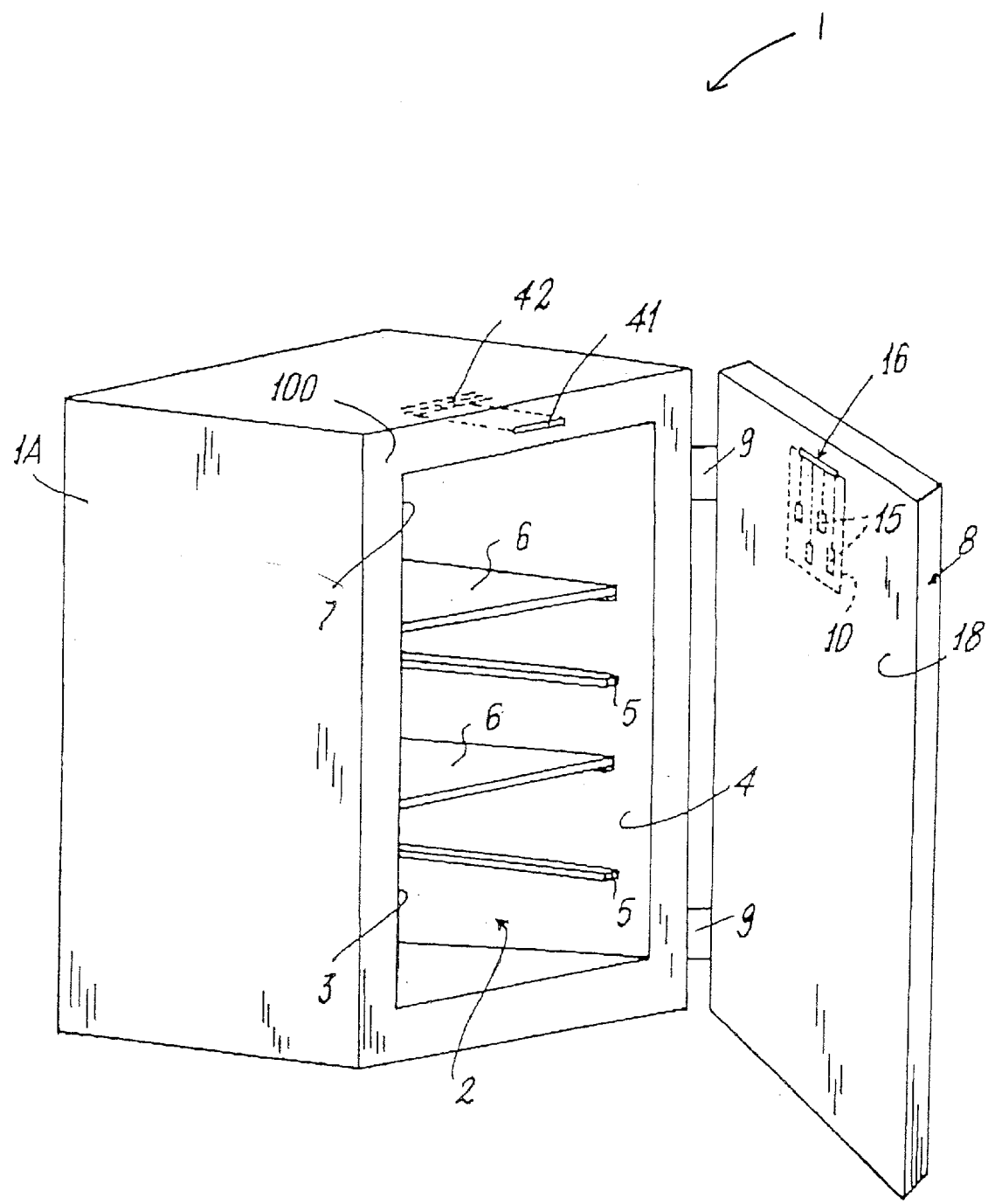
FIG. 1 is a schematic view of a household electrical appliance, a refrigerator in the example, which is provided with a device according to the invention.

With reference to the figures, a refrigerator 1 is shown schematically in FIG. 1. The refrigerator can be of the known static or fan-assisted type.

Figure 2:
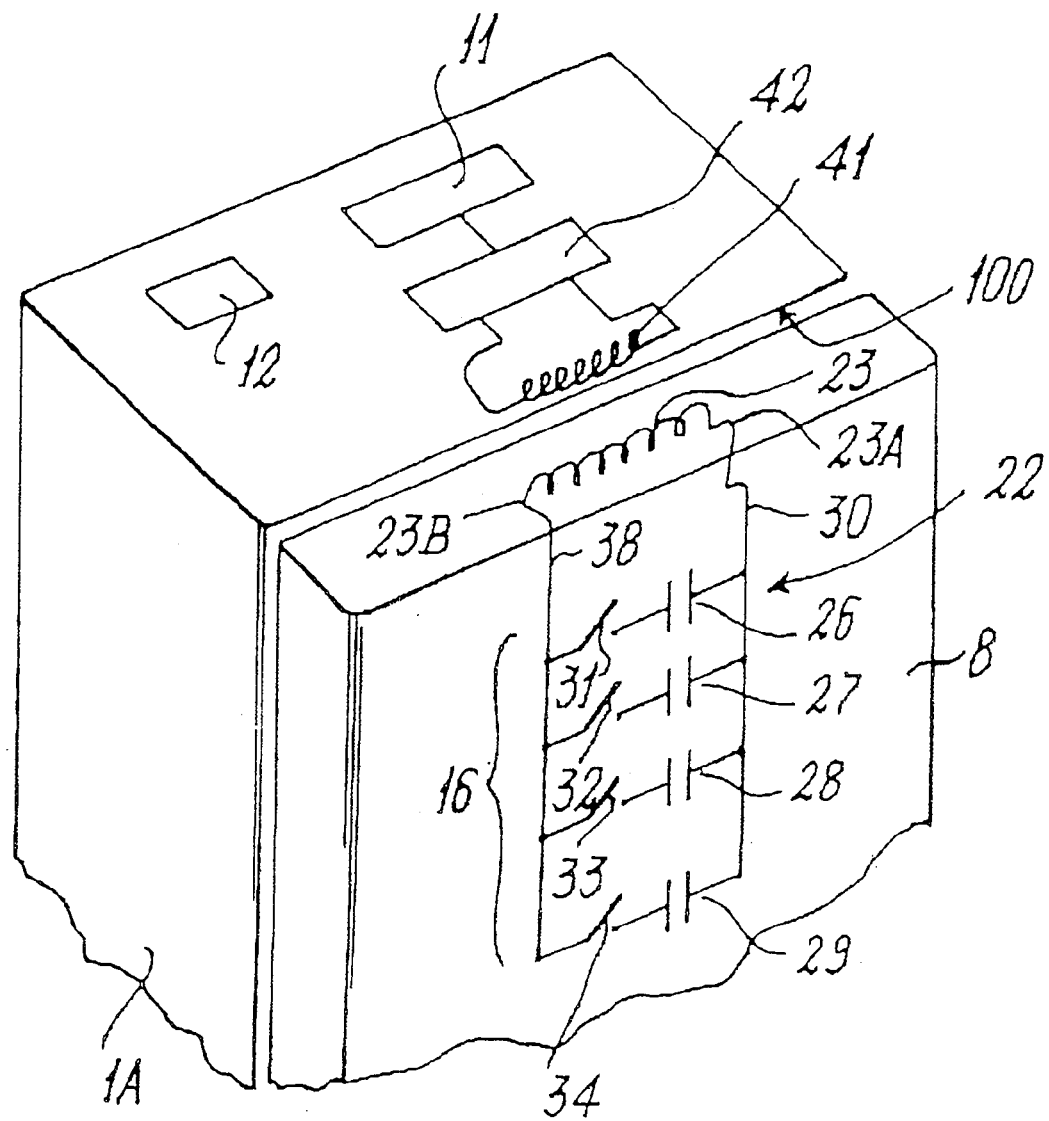
FIG. 2 is a schematic perspective front view of a part of the refrigerator of FIG. 1 in which the device of the invention is present.

In the example depicted in FIG. 1, the refrigerator is an upright refrigerator, and comprises a structure or cabinet 1A having at least one internal compartment 2 presenting opposing side walls 3, 4. Usual supports 5 are present on the side walls for supporting shelves 6. The compartment 2 is open at 7 where a door 8 is located, movable relative to the structure 1A on hinges 9. An interface 10 may be positioned on the door for setting or modifying parameters (i.e. temperature, etc.) for controlled operation of the refrigerator's operational members such as the electric motor, compressor, heater elements or microwave generators. Specifically, this interface 10 forms part of a device that is configured to cooperate with a command and control circuit 11 for the operational members, and defines the components of a refrigeration circuit 12 schematically shown in FIG. 2. By means of the interface 10 and the device of the invention, a user can set the internal temperature of the refrigerator 1, and verify data concerning the food contained within the compartment 2 on the shelves 6 or other possibly available data presented on a display (not shown) in communication with the interface 10.

The interface 10 comprises a plurality of pushbuttons 15 accessible on a (front) face 13 of the door 8 and is connected to means 16 for setting the operation of the household electrical appliance or for setting its special characteristics (in the case of the refrigerator 1, the internal temperature of its compartment 2). These means 16 cooperate with the pushbuttons 15 and are preferably positioned in correspondence with an (inner) face 18 of the door 8 facing towards the aperture 7 of the refrigerator structure 1A. These means 16 for setting for example the internal temperature of the compartment 2 are an electrical and/or electronic circuit 22 which is inserted into the door 8 in a suitable manner, and can be of active type (i.e. self-powered, for example by batteries) or of passive type.

In the figures, the circuit 22 is an electrical circuit of passive type defined by a resonant RLC circuit comprising an inductor 23 positioned in correspondence with the face 18 of the door 8 and a plurality of capacitors (for example four, as in the figures where they are indicated by 26, 27, 28 and 29) of different capacitance values. Each capacitor is connected on one side to an electrical line 30 connected to one end 23A of the inductor 23, and on the other side to a change-over switch (31, 32, 33 and 34 respectively) arranged to connect each capacitor to an electrical branch 38 connected to the other end 23B of the inductor 23. In the example, the switches are connected in any known manner to the pushbuttons 15, which enable a different switch to be operated, in order to connect the corresponding capacitor to the inductor and hence modify the resonance frequency of the circuit 22. According to a variant of the invention, the switches 31, 32, 33 and 34 are the actual pushbuttons of the interface 10. The pushbuttons 15 can, for example, enable a temperature to be selected suitable for preserving different foods. For this purpose, each pushbutton carries a symbol corresponding to a particular food. Alternatively, the pushbuttons 15 can be defined by one or more slidable selectors movable along the interface 10 on the outside of the door or by a slidable selector cooperating with reed relays defining the change-over switches: in this case the selector carries a magnet which by sliding in front of the relay defining the switch, closes it onto the corresponding electrical line. This leads to the selection of a particular capacitance value for the circuit 22 and hence to the selection of a particular resonance frequency. For each variation in the frequency of the circuit 22 it is thus possible to define, in the example under examination, a corresponding respective desired temperature within the compartment 2, this temperature being selected for example by the pushbuttons 15.

The various configurations of the switches/relays 31, 32, 33 and 34 corresponding to the various temperatures of the compartment 2 (or, in general, to various functions of the household electrical appliance) are properly displayed, with their relative functional characteristics, on the interface 10.

To achieve operation of the device of the invention, within the front wall 100 of the structure 1A opposite the inner face 18 of the door 8 there is positioned an inductor 41 connected to an oscillating circuit 42, itself connected to the refrigerator control means 11, for example a microprocessor circuit. On powering the oscillating circuit 42, of which the inductor 41 forms part, the circuit 22 is activated, each variation in the resonance frequency of said circuit 22 (obtained in the aforesaid manner) then being "read" as a variation in the resonance of the circuit 42; this is then sensed by the circuit or control circuit 11 which on the basis of the variation act on the refrigeration circuit 12.

Figure 3:
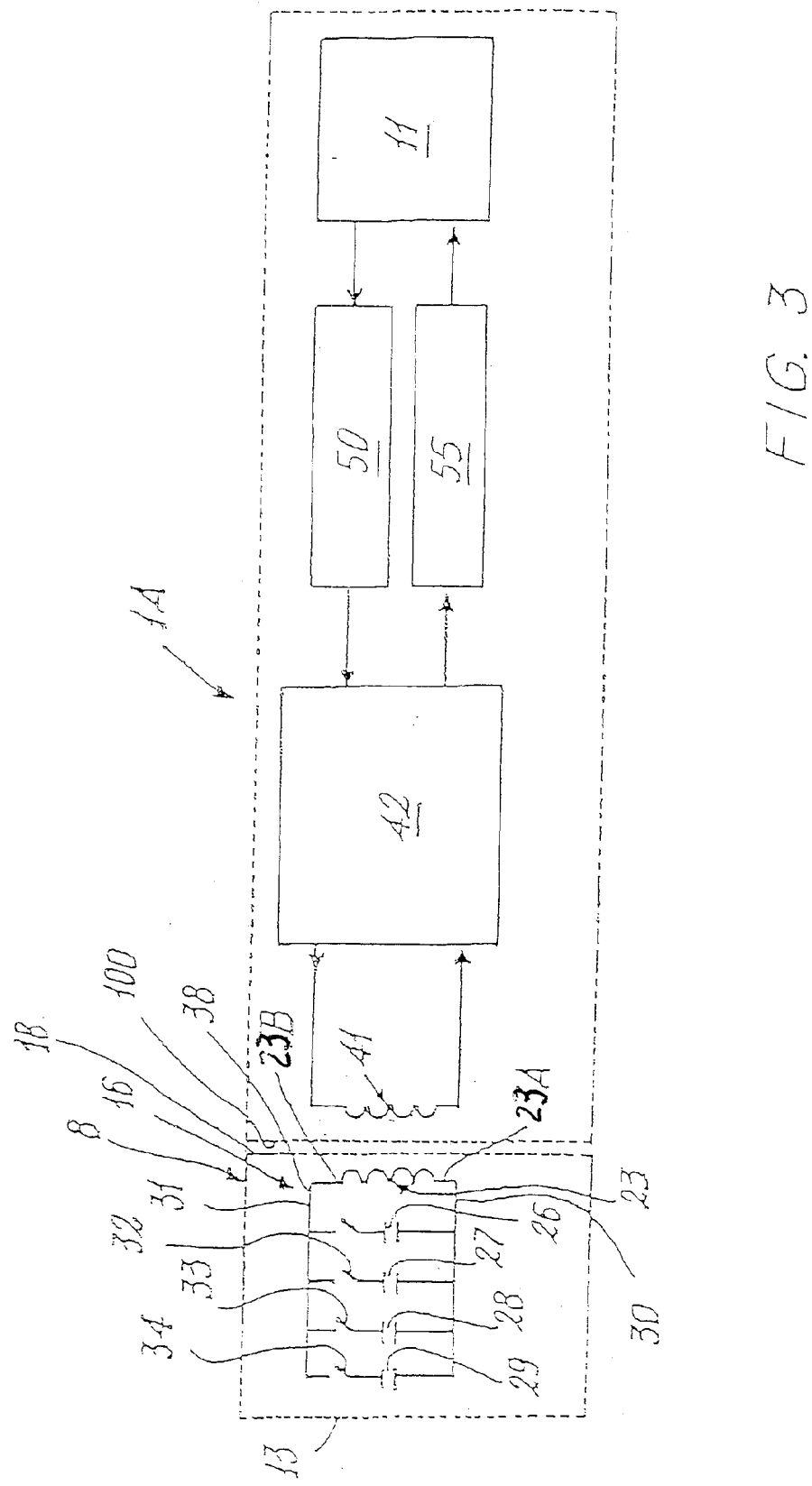
FIG. 3 is a schematic diagram showing an electrical/electronic circuit enabling the operation of the appliance of FIG. 1 to be set.

Reference will now be made specifically to FIG. 3, by which the use of the invention will be described.

It will be assumed that a refrigerator 1 is used provided with a device of the invention by which the temperature in the refrigerator compartment 2 is set.

As shown in FIG. 3, the control circuit 11 (for example of microprocessor type) is connected to a known control voltage generator or sweep generator 50 which is connected to the oscillating circuit 42 operating with controlled voltage. The circuit 42 is for example a circuit known as a frequency swept oscillator, which is well known and consequently not further described.

On powering the circuit 42, of which the inductor 41 forms part, and varying the capacitance of the resonant circuit 22, there occurs, as stated, a variation in the resonance frequency of the oscillator, which is sensed by a usual signal sensor 55 (for example a dip catcher circuit) and consequently determined by the circuit 11. On the basis of this determination, corresponding to the selection of a particular temperature within the compartment 2, the circuit 11 acts on the refrigeration circuit 12 to obtain the desired temperature within the compartment 2.

Figure 4:
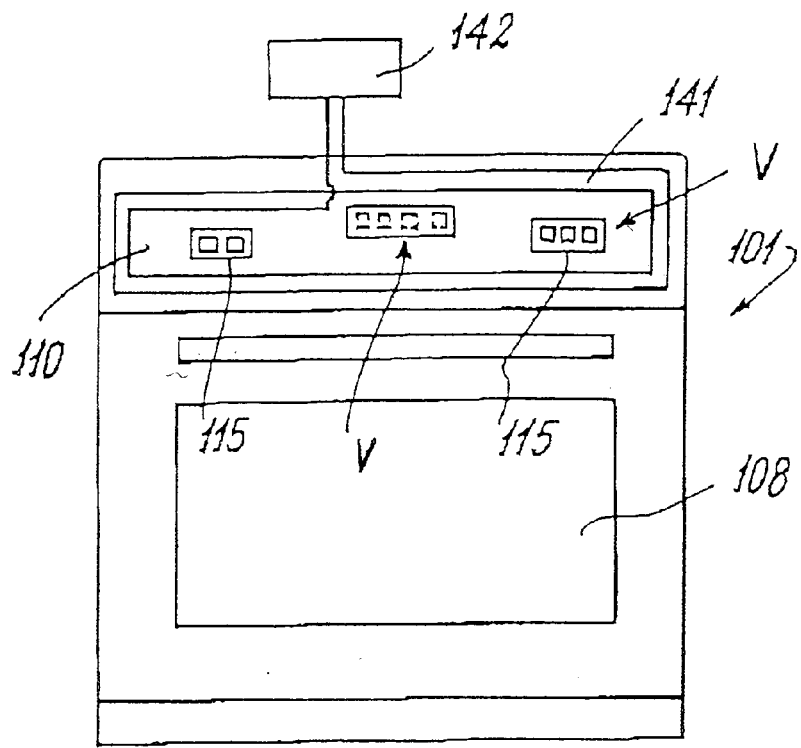
FIG. 4 is a schematic view of another household electrical appliance, an oven in this example, provided with a device in accordance with a second embodiment of the invention.
Figure 5:
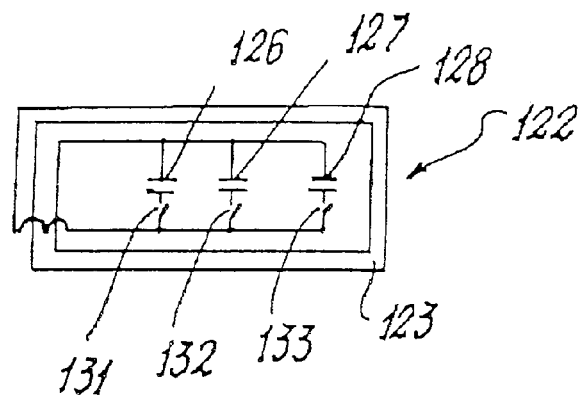
FIG. 5 is an enlarged detail of FIG. 4.

FIGS. 4 and 5 show a second embodiment of the invention in which identical or similar components are indicated by the same reference numerals as the preceding figures plus 100. FIG. 4 relates to a domestic oven 101 having a user interface 110 positioned above the oven door 108. The inductor 141 of the oscillating circuit associated with the interface 110 is in the form of a flat coil (shown schematically in FIG. 4) which surrounds substantially the entire area of the user interface 110. Each pushbutton 115 presents its own RLC passive resonant circuit 122 and comprises an inductor 123 (of flat coil type in the example of FIG. 5) and a plurality of capacitors (for example three in FIG. 4, indicated by 126, 127 and 128) of different capacitance values. The capacitors are connected to the ends of the coil 123 via change-over switches (131, 132 and 133 respectively) operable by the pushbuttons 115 (in the example of FIG. 5 the respective pushbutton 115 is of three-position type) to modify the resonance frequency of the circuit 122. It is apparent that the shape of the inductor 141 makes the sensing of the response of each individual oscillating circuit 122 totally independent of the position of the respective pushbuttons 115. In other words, the position of the pushbuttons 115 can be varied at will (provided they remain within the perimeter defined by the coil 141), without having to modify any electronic circuit, with obvious advantages in terms of design flexibility in the panel layout of the user interface. This latter can be provided in known manner, with display devices V for the characteristics set by the user, for example the temperature of the oven interior.

Two embodiments of the invention have been described. Others can however be obtained in the light of the present invention. For example, as stated, the circuit 22 can be of active type and comprise remote connection means (for example of radio-frequency or other type) arranged to dialogue directly with the control circuit 11 in order to "inform" these latter of the temperature selected by the user in correspondence with the shelf 6. Alternatively, the circuit 22 can be of the described type, but self-powered and cooperating with a device (passive, of inductor type) which is connected to the control circuit 11 but does not comprise the oscillator 42, the generator 50 or the sensor 55.

The described examples refer to a device according to the invention associated with a refrigerator or with an oven. The device can however be applied to any household electrical appliance such as a dishwasher, a washing machine, a washing-drying machine or a dryer. In all these cases, such a device, used to set various appliance functions (for example cooking temperature, power, wash program, etc.) and presenting a resonant circuit 22 in the door and control means associated with the appliance structure, enables a "user interface" to be positioned on said door without any positioning constraint arising related to the presence of electrical connections between the interface and the control circuit 11. This also enables ergonomic positioning of the interface on the appliance door.

Although the described examples refer to a resonant electrical circuit, this definition covers all other types of electronic circuits which utilize the accumulated energy to respond with a radio-frequency signal with known methods of modulating the signal. For example, such electronic circuits comprise RFID (radio frequency identification) devices which can be associated with the user interface pushbuttons of the appliance.

I claim:

1. A control device for a household electrical appliance comprising:

an interface configured to enable a user to set or modify parameters of one or more operational members of the appliance by a command and control circuit in communication with the appliance, the interface comprises one or more selectors arranged to enable setting or modifying of the parameters of the appliance, the selectors being connected to a resonant electrical circuit arranged to generate or to respond to a radio-frequency signal in a modifiable manner representative of the setting or modification effected by the user, wherein the resonant electrical circuit comprises a plurality of capacitors of mutually different capacitance values, selectively connectable to an inductor cooperating with an induction element associated with the command and control circuit and fixed to the household electrical appliance, the radio-frequency signal being sensed by the induction element which enables the command and control circuit to set or modify in the appropriate manner the parameters of the operational members for controlled operation of the household electrical appliance.

2. The device as claimed in claim 1, wherein the resonant circuit is of passive type, the induction element being connected to an oscillating circuit connected in its turn to the control circuit and receiving an electrical signal from the oscillating circuit.

3. The device as claimed in claim 1, wherein the resonant circuit is self-powered.

4. The device as claimed in claim 1, wherein the selectors co-operate with the resonant circuit and are arranged to select a capacitor of capacitance value chosen on the basis of the particular setting or modification to the desired parameters of the appliance.

5. The device as claimed in claim 4, wherein the selectors are a plurality of pushbuttons operationally connected to the various capacitors and are present on the interface.

6. The device as claimed in claim 5, wherein the pushbuttons are one or more slidable selectors moveable along the interface.

7. The device as claimed in claim 4, wherein the selectors act on switches arranged to connect different capacitors to the inductor.

8. The device as claimed in claim 2, wherein there are plural resonant circuits and the induction element encloses substantially the area defined by the user interface in such a manner as to be able to sense the response signals emitted by each of the resonant electrical circuits independently of their position on the interface.

9. The device as claimed in claim 8, wherein with each resonant electrical circuit there corresponds a selector.

10. The device as claimed in claim 1, wherein the electrical appliance comprises one of the following: a refrigerator, an electric oven, a microwave oven, a washing machine and a dryer.

11. The device as claimed in claim 1, wherein the operational member comprises one of the following: an electric motor, a motor-driven compressor and a heater element.

* * * * *